1831B2

United States Patent
Mitsuhashi et al.

(10) Patent No.: US 9,381,831 B2
(45) Date of Patent: Jul. 5, 2016

(54) RECLINING STRUCTURE OF VEHICULAR SEAT

(71) Applicant: TOYOTA BOSHOKU KABUSHIKI KAISHA, Aichi-ken (JP)

(72) Inventors: Atsutaka Mitsuhashi, Aichi-ken (JP); Syunsuke Tanaka, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/718,548

(22) Filed: May 21, 2015

(65) Prior Publication Data

US 2015/0336478 A1 Nov. 26, 2015

(30) Foreign Application Priority Data

May 23, 2014 (JP) ................................ 2014-106664

(51) Int. Cl.
*B60N 2/22* (2006.01)
*B60N 2/235* (2006.01)
*B60N 2/20* (2006.01)

(52) U.S. Cl.
CPC ................ *B60N 2/2245* (2013.01); *B60N 2/20* (2013.01); *B60N 2/2218* (2013.01); *B60N 2/2236* (2013.01)

(58) Field of Classification Search
CPC ............ B60N 2/005; B60N 2/02; B60N 2/20; B60N 2/22; B60N 2/2218; B60N 2/2231; B60N 2/2236; B60N 2/2245
USPC .......... 296/65.01, 65.05, 65.08, 65.09, 65.13, 296/65.16, 65.17; 297/378.13
See application file for complete search history.

(56) References Cited

U.S. PATENT DOCUMENTS

| | | | | |
|---|---|---|---|---|
| 6,769,741 B2 * | 8/2004 | Denning | ............. | B60N 2/3013 297/354.12 |
| 7,377,584 B2 * | 5/2008 | Griswold | ............. | B60N 2/2245 297/216.12 |
| 7,641,282 B2 * | 1/2010 | Hinata | ................. | B60N 2/2245 297/216.14 |
| 8,146,996 B2 * | 4/2012 | Vedder | ................... | B60N 2/366 297/378.13 |
| 8,408,630 B2 * | 4/2013 | Saito | ...................... | B60N 2/366 296/65.13 |
| 8,439,446 B2 * | 5/2013 | Ishii | ..................... | B60N 2/2245 296/65.16 |
| 8,506,014 B2 * | 8/2013 | Bruck | .................. | B60N 2/2245 297/378.13 |
| 2008/0129017 A1* | 6/2008 | Okazaki | ............... | B60N 2/2245 280/727 |
| 2014/0091591 A1* | 4/2014 | Ishii | ..................... | B60N 2/2245 296/65.01 |

FOREIGN PATENT DOCUMENTS

JP 2011-042269 3/2011

* cited by examiner

*Primary Examiner* — Jason S Daniels
(74) *Attorney, Agent, or Firm* — Greenblum & Bernstein, P.L.C.

(57) ABSTRACT

A reclining structure of a vehicular seat is provided with: a coupling shaft configured to couple a seat back to a vehicle main body; a slide rail provided at a side part of the vehicle main body and having a curved guide shape; a slider mounted to the slide rail; an attaching and detaching mechanism configured to detachably engage the slider and the seat back with each other; and a slide lock mechanism configured to lock movement of the slider. The slide lock mechanism is provided with: a lock member guided by and mounted to the slider to be slidable in a diametrical direction; a cam member mounted to the slider to straightly push out the lock member in the diametrical direction; and a lock teeth having a teeth face arranged to face in the diametrical direction along the guide shape of the slide rail.

5 Claims, 11 Drawing Sheets

RECLINING STRUCTURE OF VEHICULAR SEAT

CROSS-REFERENCE TO RELATED APPLICATION

This application claims priorities from Japanese Patent Application No. 2014-106664 filed on May 23, 2014, the entire subject matters of which is incorporated herein by reference.

TECHNICAL FIELD

The present disclosure relates to a reclining structure of a vehicular seat. More particularly, the present disclosure relates to a reclining structure of a vehicular seat configured to fix a seat back to a side part of a vehicle main body so that a backrest angle can be adjusted.

BACKGROUND

In the related art, a seat for an automobile has been known which is configured to engage a seat back with a vehicle side part and to thus fix a backrest angle. An example of such seat is disclosed in JP-A-2011-042269. Specifically, a lower end portion of the seat back is shaft-coupled to a base on a floor and a lock device provided at a shoulder part of a vehicle outer side is locked to a striker provided at the vehicle side part, so that the backrest angle is fixed. The striker is attached to a slide, which is provided at the vehicle side part to be slidable in backward and forward direction, and a position at which the backrest angle of the seat back is fixed can be adjusted by changing a fore-and-aft position of the slider.

In the above described related art, the slider is provided at the vehicle side part so that it can straightly slide. For this reason, there may be necessary to provide the lock device or striker with a relief structure for absorbing a difference from a trajectory along which the seat back tilts about a lower end-side axis, which makes the structure complicated. Also, if the lock device is made to have a simple configuration where a pin is simply inserted into a hole provided at the vehicle side part, it is possible to set a position of the hole to a position following the tilting trajectory of the seat back. However, it is difficult to sufficiently obtain the lock strength and to finely set a pitch of the lock.

SUMMARY

The present disclosure has been made in view of the above circumstances, and one of objects of the present disclosure is to provide a reclining structure having high performance and simplicity, and is capable to fix a seat back to a side part of a vehicle main body so that a backrest angle can be adjusted.

According to an illustrative embodiment of the present disclosure, there is provided a reclining structure of a vehicular seat configured to fix a seat back to a side part of a vehicle main body so that a backrest angle can be adjusted, the reclining structure including: a coupling shaft configured to couple the seat back to the vehicle main body in a state where the seat back is tiltable in backward and forward direction; a slide rail provided at the side part of the vehicle main body and having a guide shape curved into an arc shape about the coupling shaft; a slider mounted to the slide rail to be slidable along the guide shape; an attaching and detaching mechanism configured to detachably engage the slider and the seat back with each other; and a slide lock mechanism configured to lock movement of the slider relative to the slide rail. The slide lock mechanism includes: a lock member guided by and mounted to the slider to be slidable in a diametrical direction; a cam member mounted to the slider to straightly push out the lock member in the diametrical direction; and a lock teeth having a teeth face arranged to face in the diametrical direction along the guide shape of the slide rail, the lock teeth being configured to mesh with the lock member sliding in the diametrical direction.

DETAILED DESCRIPTION

Hereinafter, an illustrative embodiment of the present disclosure will be described with reference to the drawings.

Figure 1:
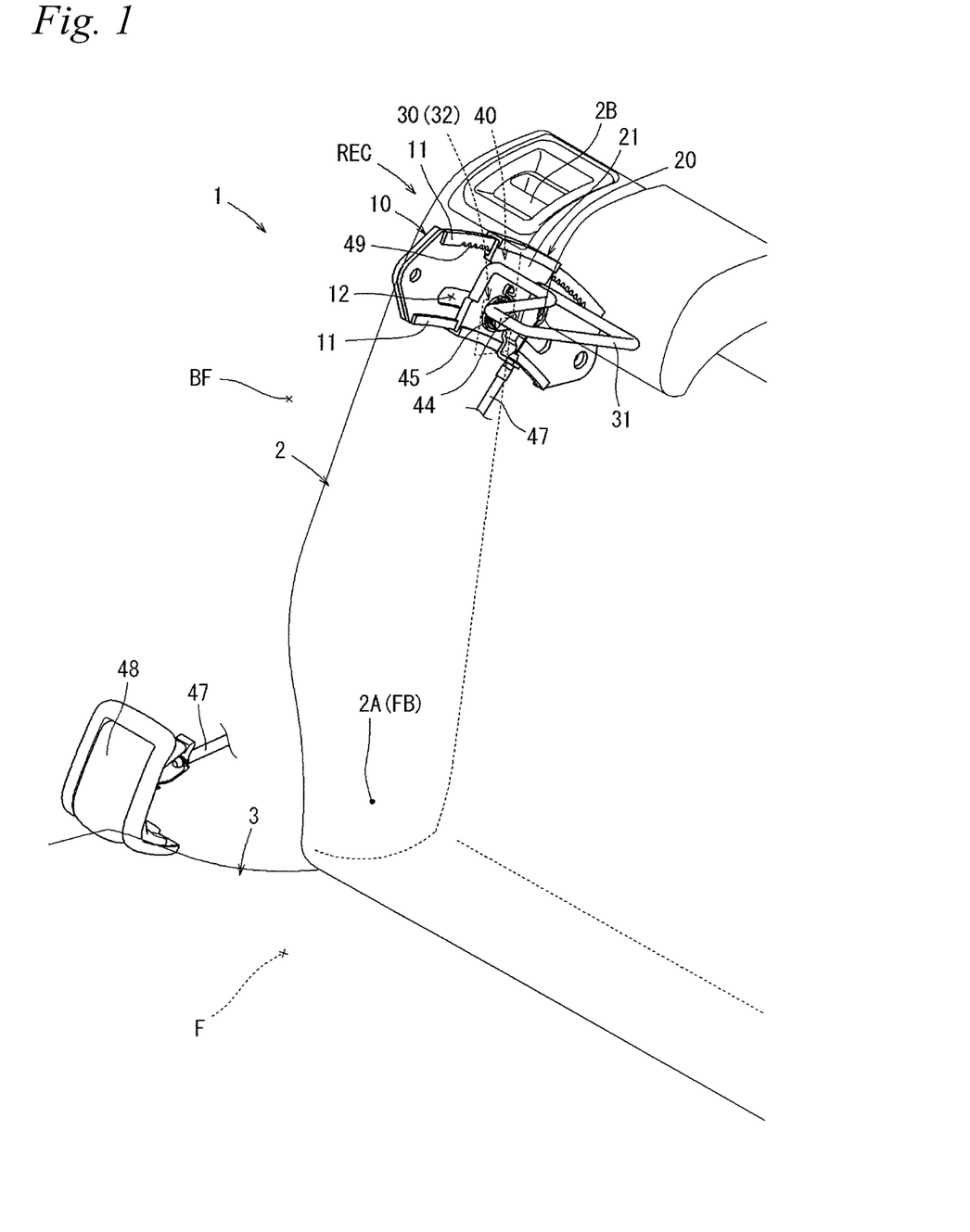
FIG. 1 is a perspective view illustrating a reclining structure of a vehicular seat according to a first illustrative embodiment.

First, a reclining structure REC of a vehicular seat (hereinafter, referred to as a reclining structure REC) according to a first illustrative embodiment is described with reference to FIGS. 1 to 11. In this illustrative embodiment, as shown in FIG. 1, the reclining structure REC has a structure where a seat back 2 of a seat 1 configured as a rear seat of an automobile is fixed to a vehicle side part BF so that a backrest angle can be adjusted. Here, the seat 1 has the seat back 2 becoming a backrest of a sitting passenger and a seat cushion 3 becoming a sitting part.

As shown in FIG. 1, the seat back 2 is coupled at lower end portions of both left and right sides thereof to a pair of left and right bases FB fixed on a floor F by coupling shafts 2A so that it can be rotated backward and forward. Specifically, the seat back 2 has a configuration where respective brackets (not shown) coupled to lower end portions of both left and right sides of an internal frame are rotatably coupled to each of a pair of left and right bases FB fixed on the floor F by the respective coupling shafts 2A of which an axis direction faces towards a with direction of the seat.

The seat back 2 has a configuration where a shoulder part of a vehicle outer side, which becomes a left side when it faces towards the shown seat back, can be detachably engaged to a slider 20 provided at a vehicle side part BF by an attaching and detaching mechanism 30 provided between the shoulder part and the slider. The slider 20 is configured to be slidable in backward and forward direction along a guide shape of a slide rail 10 provided at the vehicle side part BF. The slider 20 is configured so that the sliding can be locked at any position slid backward and forward by a slide lock mechanism 40 provided between the slider and the slide rail 10.

Figure 2:
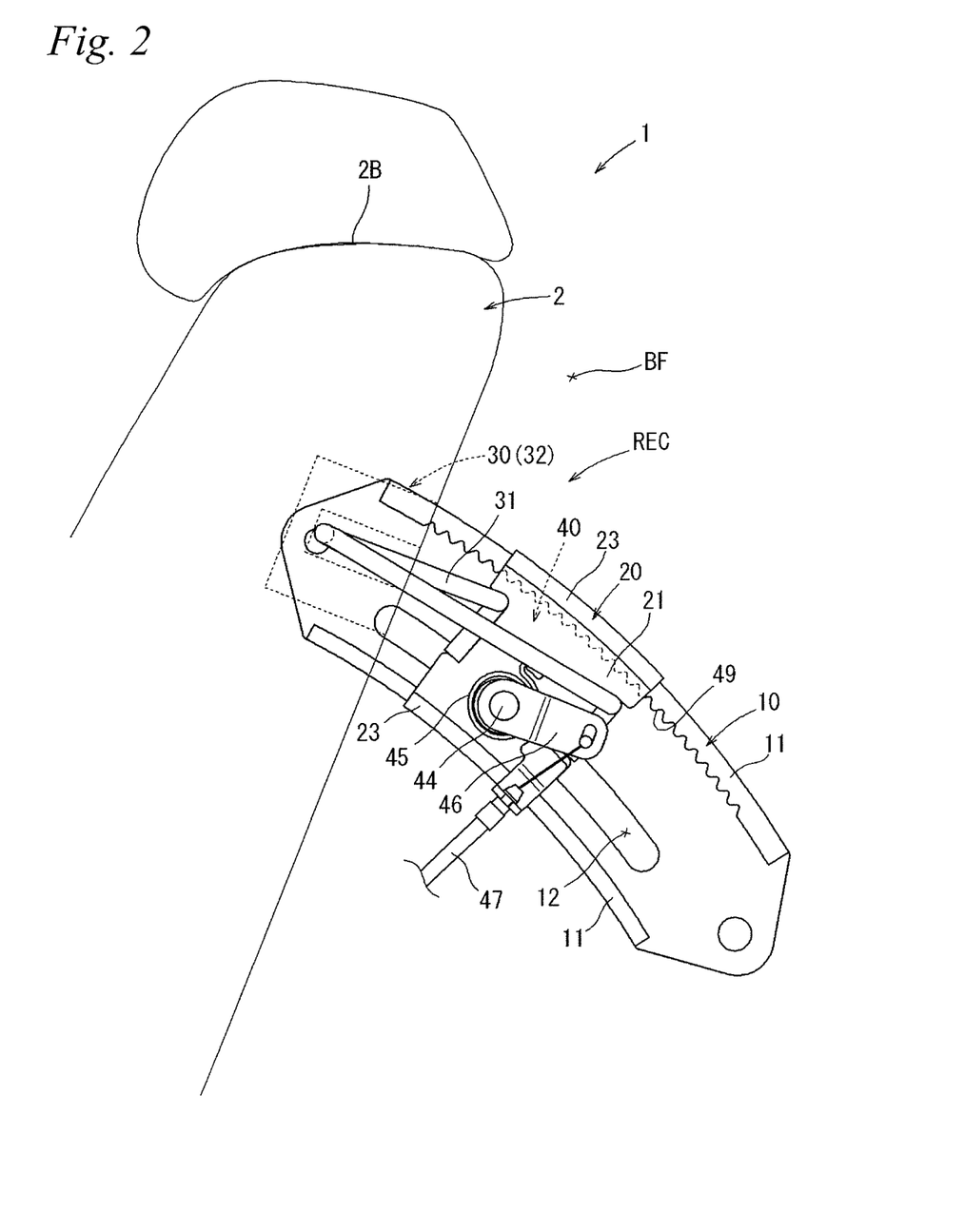
FIG. 2 is a side view of a seat back.
Figure 3:
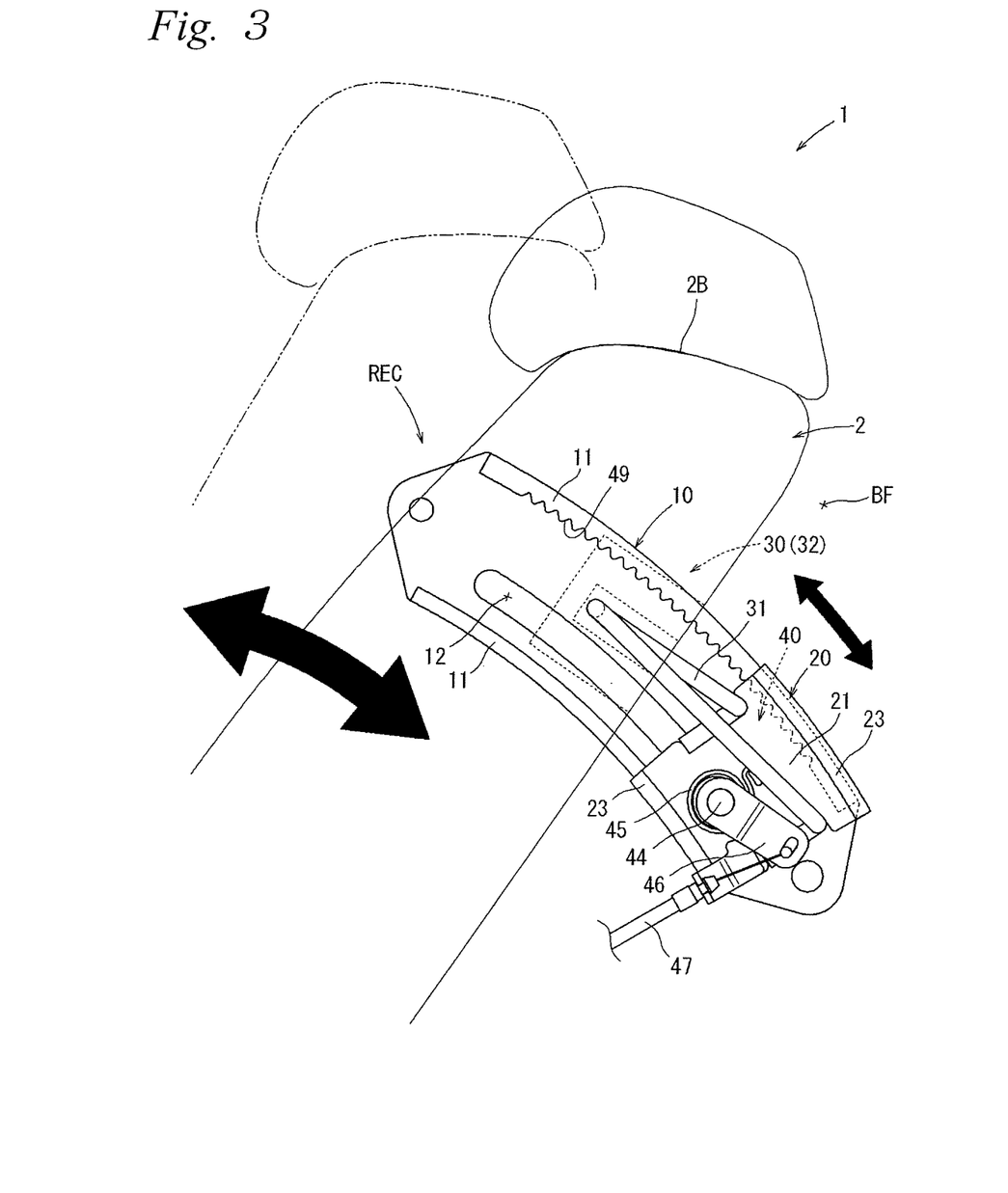
FIG. 3 is a side view illustrating a state where a backrest angle of the seat back is tilted backward.

The slide rail 10 is configured to have a guide shape for guiding the slider 20 so that the slider can slide in backward and forward direction. As shown in FIG. 2, the guide shape of the slide rail 10 is configured to have a shape curved into an arc shape having a center, which is the coupling shaft 2A (refer to FIG. 1) becoming a center of rotation of the seat back 2. Thereby, it is possible to change a backrest angle of the seat back 2 by sliding the slider 20 along the guide shape of the slide rail 10 with the seat back 2 being engaged to the slider 20 (refer to FIGS. 2 and 3).

The guide shape of the slide rail 10 is configured so that a rear side thereof descends into a quadrant region of a rear-upper side of the coupling shaft 2A becoming a center of rotation of the seat back 2. Thereby, it is possible to change the backrest angle of the seat back 2 within an angle region, in which the seat back is inclined more backward than an upright posture, by sliding the slider 20 along the guide shape of the slide rail 10.

At a usual state, the slide lock mechanism 40 is configured to keep a state where the movement of the slider 20 is locked by the urging, so that the movement of the slider 20 relative to the slide rail 10 is stopped and the backrest angle of the seat back 2 is maintained with being fixed. When a release lever 48, which is provided in the vicinity of the side of the seat 1 of the vehicle side part BF and is coupled to the slide lock mechanism 40, is pulled up, the sliding-locked state of the slider 20 is released. By the release operation, the slider 20 can slide in backward and forward direction with respect to the slide rail 10 and the backrest angle of the seat back 2 can be changed. When the pull-up operation of the release lever 48 is released, the slider 20 is returned to the sliding-locked state. Here, the release lever 48 corresponds to the 'operation member' of the present disclosure.

Figure 4:
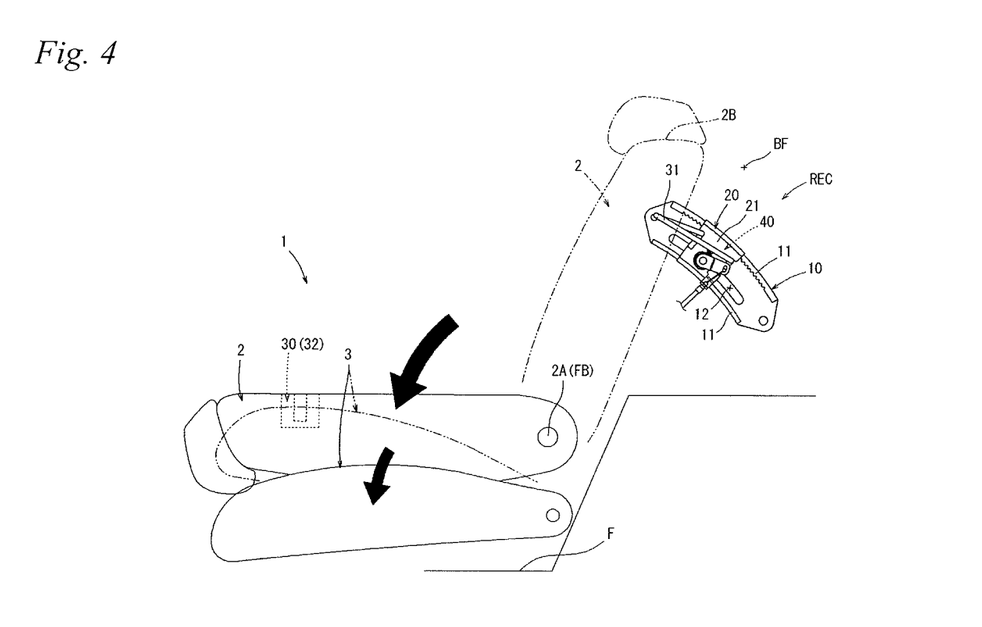
FIG. 4 is a side view illustrating a state where the seat back is folded forward.

When a shoulder lever 2B provided for the shoulder part of the vehicle outer side is pulled forward, the engaged state of the seat back 2 with the slider 20 by the attaching and detaching mechanism 30 is released, so that the seat back 2 can be folded forward beyond the above-described adjustment range of the backrest angle, as shown in FIG. 4. For this reason, it is possible to perform a seat arrangement of folding the seat back 2 forward to make a backside thereof be flush with a luggage floor.

Also, the seat back 2 is configured so that when the seat back 2 is raised backward from the forward folded position to a position at which the shoulder part of the vehicle outer side is pushed in the slider 20 of the vehicle side part BF, the attaching and detaching mechanism 30 configured between the shoulder part and the slider is pushed and engaged due to the corresponding movement and is returned to the state where it is fixed to the vehicle side part BF. In the below, the attaching and detaching mechanism 30 of the seat back 2 with respect to the slider 20 of the vehicle side part BF and the slide lock mechanism 40 of the slider 20 with respect to the slide rail 10 are described in detail together with the configurations of peripheral parts thereof.

Figure 5:
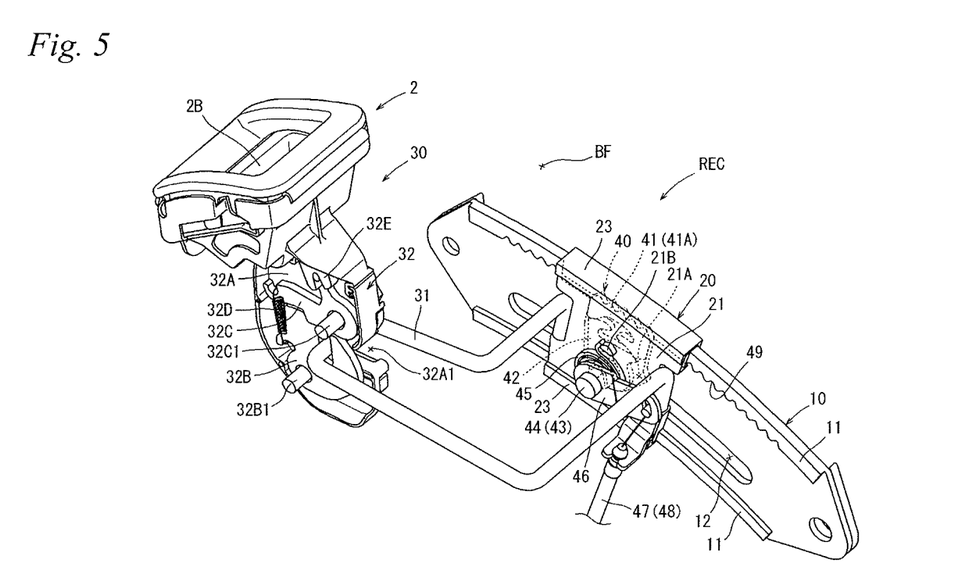
FIG. 5 is a perspective view illustrating a schematic configuration of an attaching and detaching mechanism.
Figure 6:
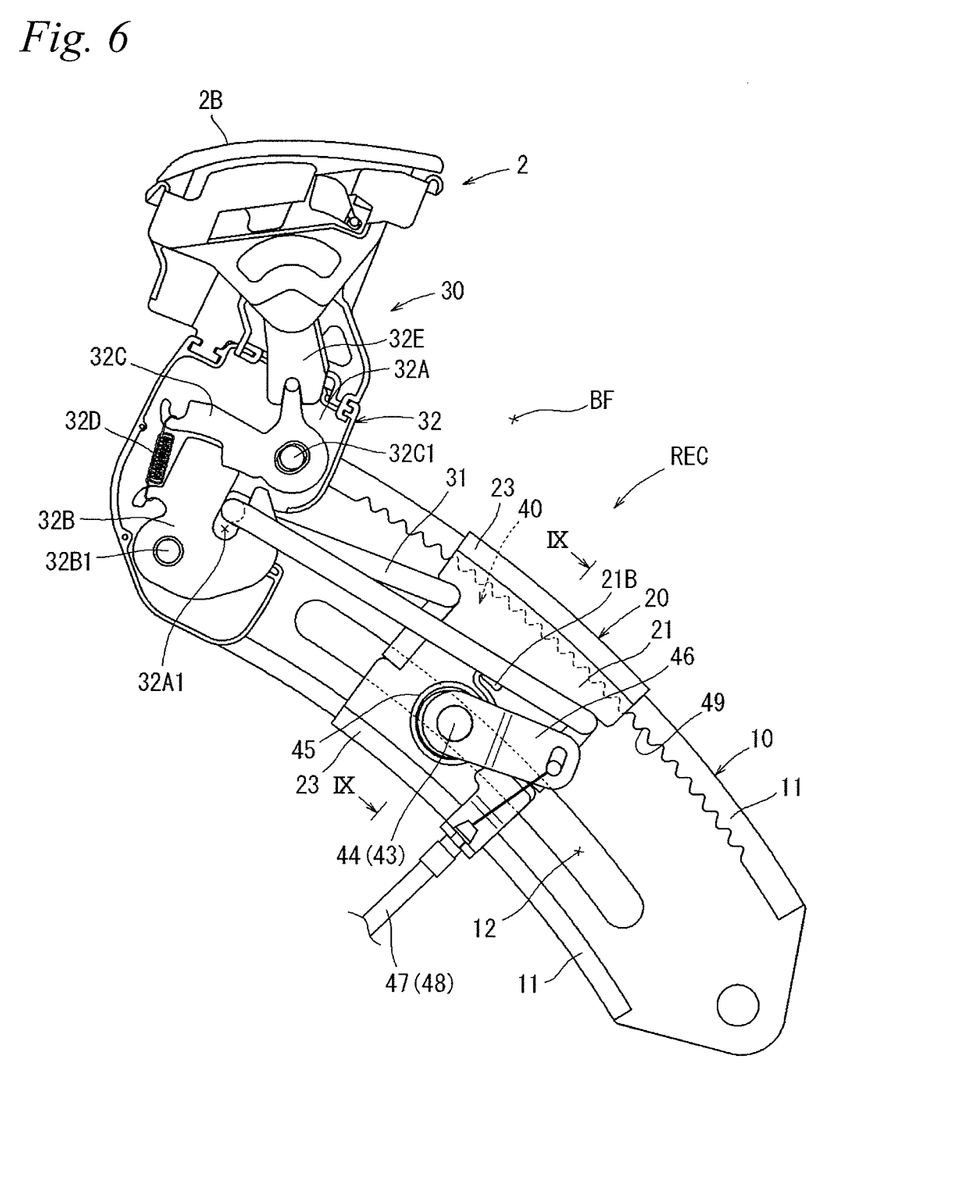
FIG. 6 is a side view of the structure shown in FIG. 5.

First, the attaching and detaching mechanism 30 is described with reference to FIGS. 5 to 7. The attaching and detaching mechanism 30 is configured by a striker 31 provided for the slider 20 of the vehicle side part BF and an engaging device 32 provided for the shoulder part of the vehicle outer side of the seat back 2 and detachably mounted to the striker 31. The striker 31 is formed by bending one rod member made of steel into a frame shape. Both end portions of the striker 31 are integrally connected to the slider 20.

The engaging device 32 has a support plate 32A integrally fixed to the seat back 2, a latch 32B rotatably coupled to the support plate 32A via a first support shaft 32B1, a pole 32C rotatably coupled to the support plate 32A via a second support plate 32C1, a tension spring 32D bridging between the latch 32B and the pole 32C, and an operation arm 32E configured to operate the pole 32C. The support plate 32A is formed to have a recessed accommodation hole 32A1 capable of accommodating a front frame part of the striker 31.

Figure 7:
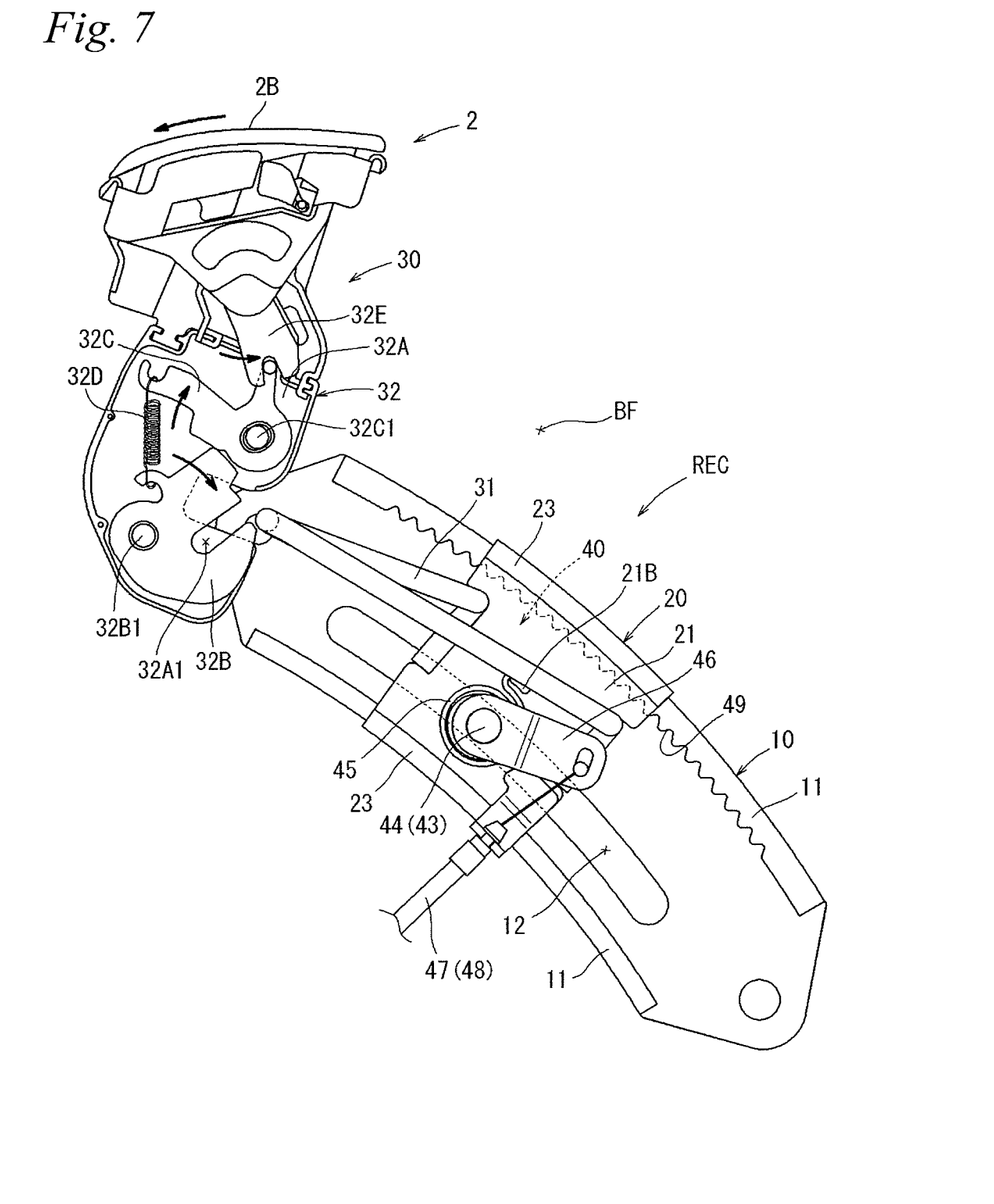
FIG. 7 is a side view illustrating a state where the attaching and detaching mechanism is detached.

As shown in FIG. 7, at a state before the front frame part of the striker 31 is accommodated in the accommodation hole 32A1, the latch 32B is kept by an urging force of the tension spring 32D with a part of the shape thereof being exposed in the accommodation hole 32A1. When the front frame part of the striker 31 is accommodated in the accommodation hole 32A1, the latch 32B is pushed due to the corresponding movement, so that the latch 32B is rotated about the first support shaft 32B1. Accompanied by the rotation, the latch 32B permits the front frame part of the striker 31 to be accommodated in the accommodation hole 32A1 and a part of the shape thereof is turned and protrudes towards an exit of the front frame part of the striker 31 accommodated in the accommodation hole 32A1, so that the latch 32B blocks the accommodation hole 32A1 (refer to FIGS. 5 and 6).

As shown in FIG. 7, at the state where the front frame part of the striker 31 is accommodated in the accommodation hole 32A1, the pole 32C is kept at a state, in which it is pressed and contacted to an outer peripheral part of the latch 32B, by the urging force of the tension spring 32D. When the front frame part of the striker 31 is accommodated in the accommodation hole 32A1 and the latch 32B is thus pushed and turned, the pole 32C is fitted into a recess portion formed on the outer peripheral part of the latch 32B by the urging force of the tension spring 32D, thereby locking the return rotation of the latch 32B. By the lock, the striker 31 accommodated in the accommodation hole 32A1 of the engaging device 32 is kept not to separate by the latch 32B and the engaging device 32 and the striker 31 are kept at the engaged state (refer to FIGS. 5 and 6).

The engaged state of the engaging device 32 with the striker 31 is released by pulling forward the shoulder lever 2B provided for the shoulder part of the vehicle outer side of the seat back 2 described with reference to FIG. 1. Specifically, when the shoulder lever 2B is operated, the operation arm 32E extending from the shoulder lever 2B operates the pole 32C described with reference to FIGS. 5 and 6, so that the pole 32C is operated in a direction of releasing from the fitted state with the recess portion of the latch 32B against the urging force of the tension spring 32D. Thereby, the latch 32B is rotated towards the initial position by the urging force of the tension spring 32D so as to push the striker 31 towards the outside of the accommodation hole 32A1, so that the striker 31 is released from the engaged state with the engaging device 32.

Figure 8:
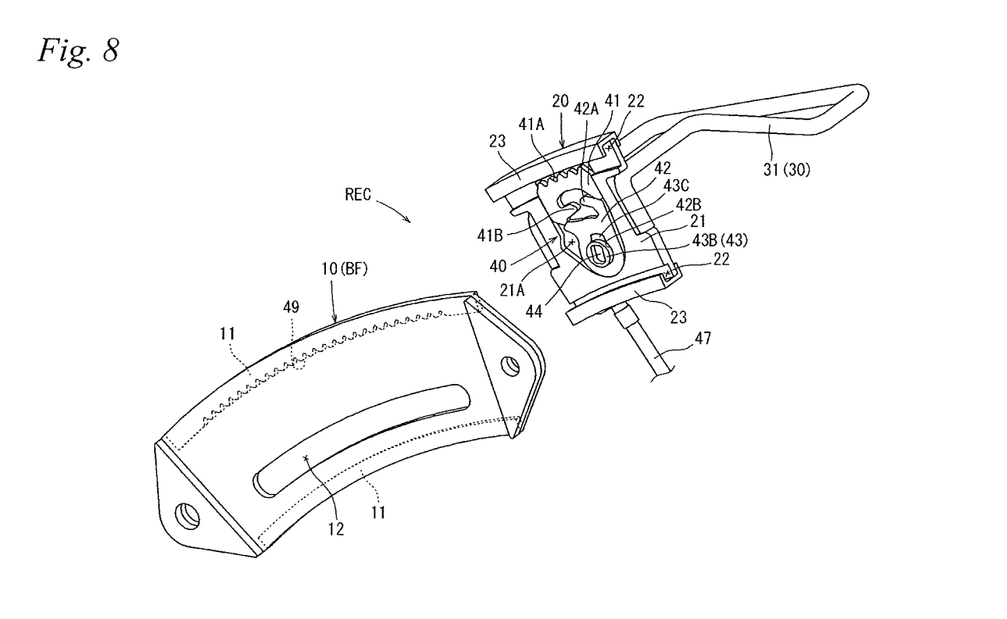
FIG. 8 is an exploded perspective view illustrating a state where a slider is detached from a slide rail.
Figure 10:
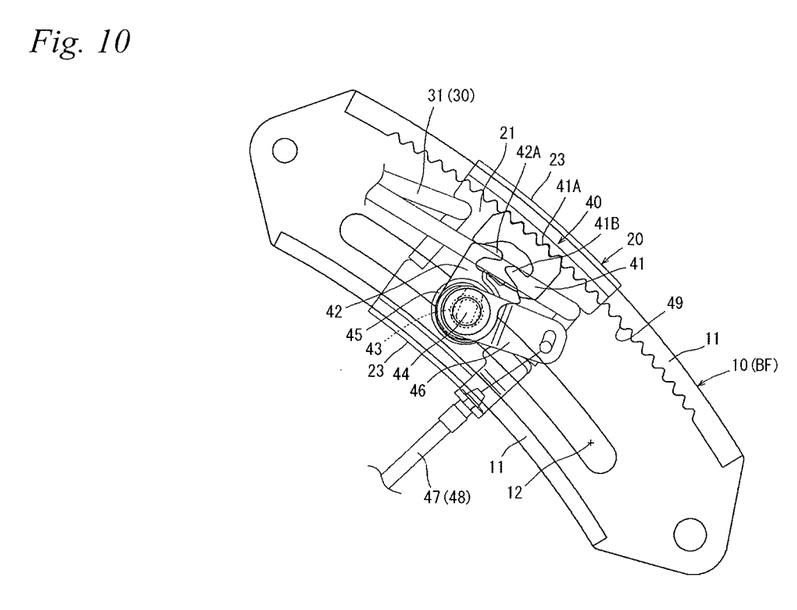
FIG. 10 is a pictorial view illustrating a locked state of a slide lock mechanism.
Figure 11:
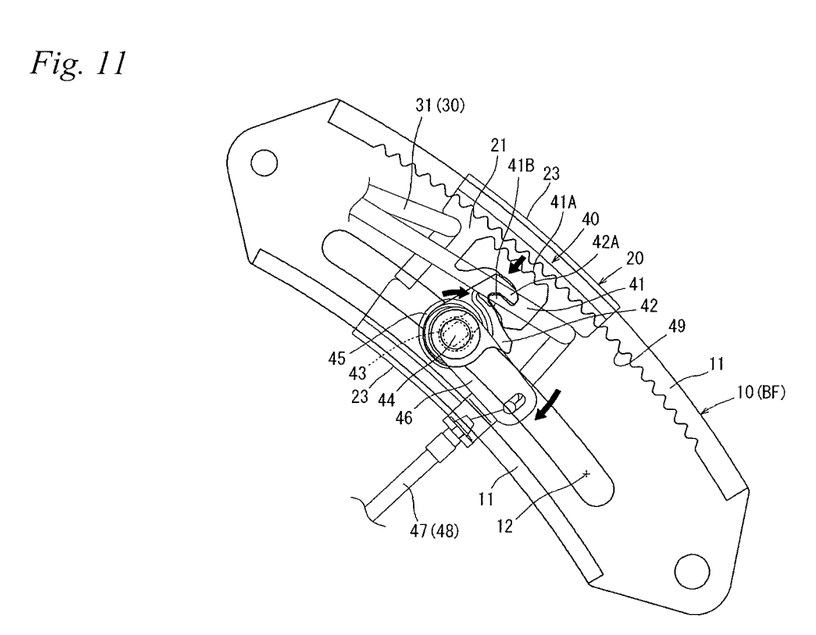
FIG. 11 is a pictorial view illustrating a release state of the slide lock mechanism.

Subsequently, the slide rail 10 provided at the vehicle side part BF, the slider 20 and the slide lock mechanism 40 are described in terms of the configurations thereof with reference to FIG. 11. As shown in FIGS. 8, 10 and 11, the slide rail 10 has a main body part formed by one plate member cut into an arc-curved shape. Each of upper and lower peripheral edge portions on an inner surface of the slide rail 10 is formed with an arc-shaped peripheral edge shelf 11 protruding in a plate thickness direction along a shape of the peripheral edge portion. The peripheral edge shelf 11 functions as a guide part configured to guide slide movement of the slider 20 in backward and forward directions by the peripheral edge portion shape thereof.

Figure 9:
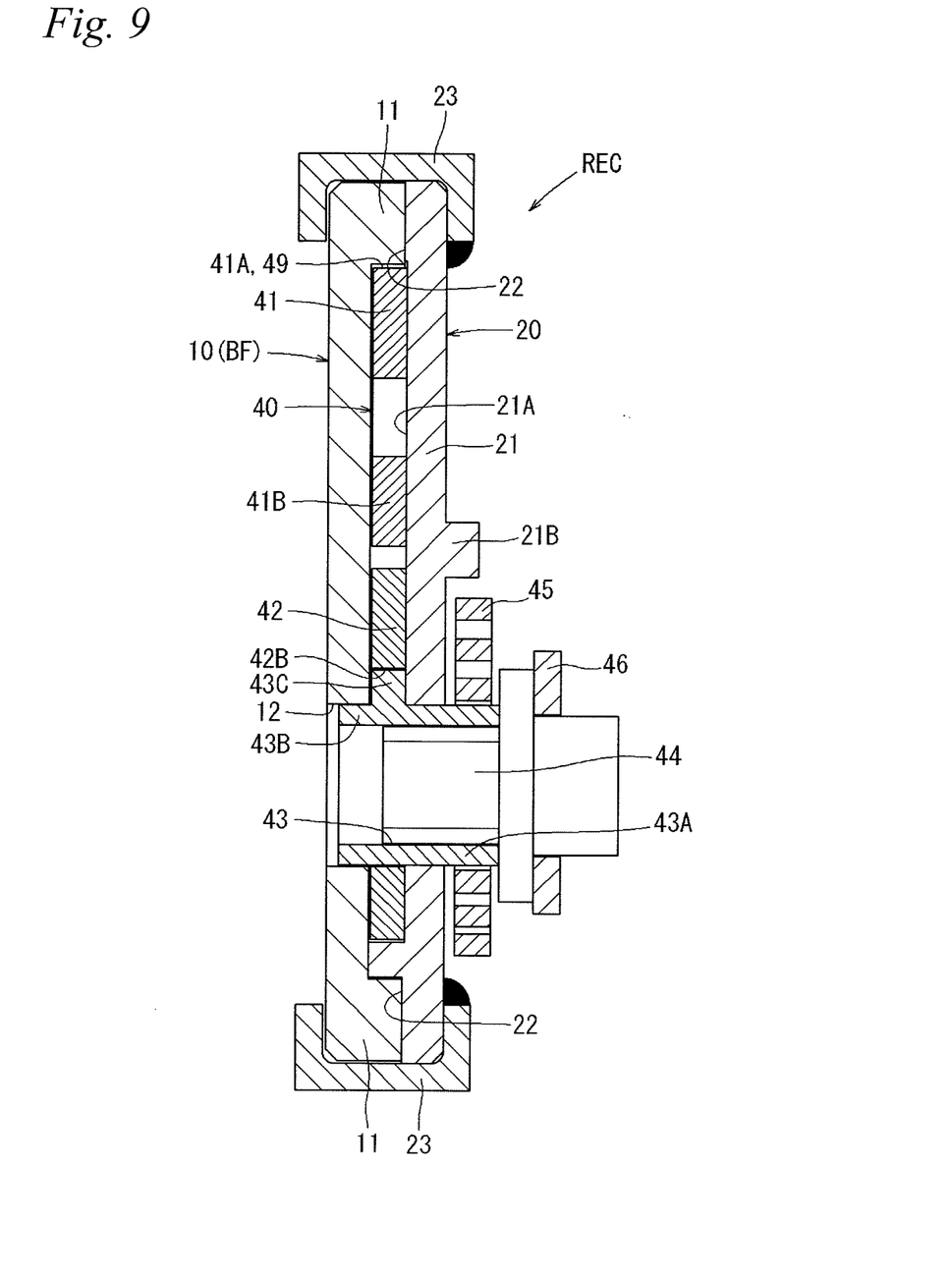
FIG. 9 is a sectional view taken along a line IX-IX shown in FIG. 6.

Also, the upper peripheral edge shelf 11 of the respective peripheral edge shelves 11 is formed on its lower surface with lock teeth 49 (internal teeth) configuring the slide lock mechanism 40 (which will be described later). The lock teeth 49 form tooth surfaces continuously formed at an equal interval in the backward and forward directions. Also, the slide rail 10 is formed at its central part in a height direction with a penetrated slit 12 extending into an arc shape backward and forward along the central part. As shown in FIGS. 8 and 9, the slit 12 is configured to function as an accommodation recess for accommodating a cylindrical part 43B of a hinge cam 43 mounted to the slider 20 in the plate thickness direction and supporting the same from both sides in the height direction.

The slider 20 has a main body part formed by one plate member cut into a substantially rectangular shape. A central part of the slider 20 is configured as a guide part 21 for mounting and supporting a lock member 41, a cam member 42, a hinge cam 43 and a lock spring 45, which configure the slide lock mechanism 40. Each of upper and lower peripheral edge portions of the guide part 21 is formed with a peripheral edge recess 22 that is curved into an arc shape capable of accommodating each peripheral edge shelf 11 in the plate thickness direction along the shape of each peripheral edge shelf 11 formed at each of the upper and lower peripheral edge portions of the slide rail 10.

Also, each of the upper and lower peripheral edge portions of the guide part 21 is integrally coupled with a hook piece 23 having a hook shape protruding into a shape covered and hooked to each peripheral edge recess 22 from an outer peripheral side. The hook piece 23 is configured to function as a slide guide that is hooked to each peripheral edge shelf 11 of the slide rail 10 accommodated in each peripheral edge recess 22 of the guide part 21 from the outer peripheral side (upper or lower side), respectively, abuts on each peripheral edge shelf 11 in the height direction and in the plate thickness direction (seat width direction) and is slidably engaged thereto. The hook piece 23 is also formed to have a shape curved into an arc shape along the shape of each peripheral edge shelf 11 of the slide rail 10.

When the upper and lower peripheral edge shelves 11 of the slide rail 10 are inserted into spaces, which are formed between the respective hook pieces 23 and the respective peripheral edge recesses 22 formed at each of the upper and lower peripheral edge portions of the slider, from any one end portion with respect to the sliding direction, the slider 20 is mounted to the slide rail 10 so that it can slide in backward and forward direction along the guide shape of the slide rail 10 curved into an arc shape. By the mounting, the slider 20 is mounted to the slide rail 10 in a compact shape in the seat width direction with overlapping with each other in the plate thickness direction (refer to FIG. 9). Also, by the mounting, the slider 20 is mounted to the slide rail 10 to be slidable in backward and forward direction along the curved guide shape of the slide rail 10.

As shown in FIGS. 8 to 10, the slide lock mechanism 40 has the lock member 41, the cam member 42, the hinge cam 43, an operation shaft 44, the lock spring 45, a release arm 46, a release cable 47 and a release lever 48, which are mounted to the guide part 21 of the slider 20, and the lock teeth 49 formed at the slide rail 10. As shown in FIGS. 8 and 9, the lock member 41 is accommodated in an accommodation recess 21A concavely formed on a surface (inner side plate surface) of the guide part 21 of the slider 20, which faces the slide rail 10. Thereby, the lock member 41 is mounted to the guide part 21 of the slider 20 with being supported from both sides so that it can move only in radially inward and outward directions in the accommodation recess 21A, i.e., towards inner and outer sides of a radial direction perpendicular to the sliding direction of the slider 20 relative to the slide rail 10.

As shown in FIGS. 9 and 10, the lock member 41 is configured so that when it moves in the radially outward direction, external teeth 41A formed on an outer peripheral surface becoming a tip surface thereof are introduced into the peripheral edge recess 22 formed at the upper peripheral edge portion of the guide part 21. By the movement, the external teeth 41A of the lock member 41 is meshed with the lock teeth 49 formed on a lower surface of the upper peripheral edge shelf 11 of the slide rail 10, which is exposed into the peripheral edge recess 22.

The external teeth 41A formed on the outer peripheral surface of the lock member 41 are continuously formed at an equal interval in the backward and forward directions so that the external teeth can be meshed with the lock teeth 49, in conformity to the curved shape of the tooth surfaces of the lock teeth 49 formed on the lower surface of the upper peripheral edge shelf 11 of the slide rail 10. The lock member 41 is configured so that all the tooth surfaces of the external teeth 41A formed on the outer peripheral surface of the lock member 41 are all together meshed with the tooth surfaces of the lock teeth 49 formed at the slide rail 10.

Therefore, when the lock member 41 is meshed with the lock teeth 49 of the slide rail 10, the sliding of the slider 20 relative to the slide rail 10 is locked. That is, the lock member 41 is supported to the slider 20 so that it can move only in the radially inward and outward directions, and the lock member 41 is meshed with the lock teeth 49 of the slide rail 10, so that the movement of the slider 20 relative to the slide rail 10 in the sliding direction is restrained via the lock member 41.

Also, as shown in FIG. 11, when the lock member 41 is moved in the radially inward direction, the external teeth 41A formed on the outer peripheral surface thereof are retreated downwards from the upper peripheral edge recess 22 (refer to FIG. 8) of the guide part 21. By the movement, the lock member 41 is released from the meshed state with the lock teeth 49 of the slide rail 10, so that the sliding-locked state of the slider 20 is released.

As shown in FIGS. 8 and 9, the cam member 42 is accommodated in the accommodation recess 21A of a concave shape formed at the guide part 21 of the slider 20 and is arranged in a radially inner area of the lock member 41. Specifically, a central part of the cam member 42 is supported via the hinge cam 43 so that the cam member 42 can be rotated in an in-plane direction with respect to the guide part 21 in the accommodation recess 21A.

As shown in FIG. 10, at a usual state, the cam member 42 is rotationally urged to the guide part 21 of the slider 20 in one rotating direction (a counterclockwise direction, in FIG. 10) by an urging force of the lock spring 45 applied from the hinge cam 43 (which will be described later). Thereby, at the usual state, the cam member 42 is configured to press the lock member 41 from the radially inner side by the outer peripheral surface thereof, to push out the lock member 41 in the radially outward direction and to keep the lock member 41 at a state where the lock member 41 is pressed and meshed with the lock teeth 49 of the slide rail 10.

Also, as shown in FIG. 11, when the cam member 42 is rotationally operated in the other rotating direction (a clockwise direction, in FIG. 11) against the rotating urging force of the lock spring 45, the cam member 42 pulls the lock member 41 in the radially inward direction, thereby releasing the meshed state with the lock teeth 49 of the slide rail 10. Specifically, when the cam member 42 is turned in the other rotating direction (the clockwise direction, in FIG. 11), a hook 42A formed on an outer peripheral part thereof is hooked to a hooking part 41B formed at an inner peripheral part of the lock member 41, thereby pulling the lock member 41 in the radially inward direction by the rotation.

As shown in FIGS. 8 and 9, the hinge cam 43 has a shaft part 43A axially extending in a substantially cylindrical shape and a cylindrical part 43B protruding in a cylindrical shape of a large diameter from one end of the shaft part 43A. The cylindrical part 43B is formed at one place of an outer peripheral part thereof with a key-shaped operation projection 43C protruding in the radially outward direction. The operation projection 43C is axially inserted into a through-hole 42B formed at the central part of the cam member 42, so that the cylindrical part 43B is integrally fitted to the cam member 42 in the rotating direction.

Here, the lock member 41 and the cam member 42 are accommodated in the accommodation recess 21A formed at the guide part 21 of the slider 20, so that they are provided to be substantially flush with the inner side plate surface of the guide part 21. However, the cylindrical part 43B of the hinge cam 43 is formed to protrude more axially than the inner side plate surface of the guide part 21, and the protruding end portion of the cylindrical part 43B is fitted in the slit 12 formed at the slide rail 10, so that the hinge cam 43 is supported from both sides in the height direction. Thereby, the hinge cam 43 is rotatably supported (both ends are supported) to both the slider 20 and the slide rail 10. Therefore, the cam member 42 is supported from the center-side thereof with the high support strength by the hinge cam 43 of which both ends are supported, so that the lock member 41 is strongly pressed to the lock teeth 49 of the slide rail 10 and the high lock strength is secured.

The slit 12 formed at the slide rail 10 extends into an arc shape along a trajectory along which the cylindrical part 43B is moved by the sliding of the slider 20. Thereby, the slit 12 can support the cylindrical part 43B of the hinge cam 43 from both sides in the height direction so that the cylindrical part 43B can be rotated and the movement accompanied by the sliding of the slider 20 can be relieved.

The hinge cam 43 is mounted at a state where the shaft part 43A is inserted into the guide part 21 of the slider 20 in the plate thickness direction from the accommodation recess 21A and is shaft-supported to be rotatable and at a state where the cylindrical part 43B of the large diameter is integrally fitted in the through-hole 42B of the cam member 42 in the rotating direction. Thereby, the hinge cam 43 is mounted to be rotated integrally with the cam member 42 with rotatably shaft-supporting the cam member 42 to the guide part 21 of the slider 20.

The protruding end portion of the shaft part 43A of the hinge cam 43, which is inserted into the guide part 21 of the slider 20, is hooked with the spirally-shaped lock spring 45 between the outer side plate surface of the guide part 21 and the end portion. At the usual state, the hinge cam 43 is applied with the urging force, which rotates the cam member 42 in the one rotating direction (counterclockwise direction in FIG. 10) becoming the rotating direction of the lock with respect to the guide part 21 of the slider 20, by the lock spring 45.

An inner peripheral-side end portion of the lock spring 45 is bent into a rectangular shape and is integrally fitted to a rectangular outer peripheral part, which is formed at an end portion of the shaft part 43A of the hinge cam 43, in the rotating direction. Also, an outer peripheral-side end portion of the lock spring 45 is hooked and mounted to a pin-shaped spring hooking part 21B protruding upwards from the outer side plate surface of the guide part 21.

As shown in FIGS. 9 to 11, the operation shaft 44 is axially inserted into the hinge cam 43 from the shaft part 43A-side and is integrally coupled thereto in the rotating direction. The release arm 46 having a long plate shape is integrally coupled to the operation shaft 44 in the rotating direction. Also, the release cable 47 coupled to the release lever 48 (refer to FIG. 1) is coupled to a tip portion of the release arm 46. Thereby, when the release lever 48 is pulled up, the release lever 48 is rotated through the release cable 47. Then, the operation shaft 44 applied with the rotational operating force from the release lever 48 operates the hinge cam 43 in the rotating direction against the urging of the lock spring 45, so that the lock member 41 is released from the meshed state with the lock teeth 49 of the slide rail 10.

In summary, the reclining structure REC of the illustrative embodiment is configured as follows. That is, the reclining structure REC is configured to fix the seat back 2 to the vehicle side part BF (a side part of the vehicle main body) so that the backrest angle can be adjusted. The reclining structure REC has the coupling shaft 2A configured to couple the seat back 2 to the base FB (vehicle main body) on the floor F so that the seat back 2 can be tilted backward and forward, the slide rail 10 provided at the vehicle side part BF and having a guide shape curved into an arc shape about the coupling shaft 2A, the slider 20 mounted to the slide rail 10 to be slidable along the guide shape, the attaching and detaching mechanism 30 configured to detachably engage the slider 20 and the seat back 2 each other, and the slide lock mechanism 40 configured to lock the movement of the slider 20 relative to the slide rail 10.

The slide lock mechanism 40 has the lock member 41 guided and mounted to the slider 20 to be diametrically slidable, the cam member 42 mounted to the slider 20 to straightly push out the lock member 41 in the diametrical direction, and the lock teeth 49 of which the teeth face are formed to face in the diametrical direction along the guide shape of the slide rail 10, and configured to mesh with the lock member 41 slid in the diametrical direction. In this way, the slide lock mechanism 40 is configured by the diametrically meshing structure, so that it is possible to configure the slide lock mechanism 40 capable of sufficiently securing the lock strength without increasing a volume of the slide lock mechanism 40 in the seat width direction, even though a pitch of the lock is finely set.

Also, the slide lock mechanism 40 is configured so that the lock member 41 is pushed out in the diametrically outward direction and is meshed with the lock teeth 49 of the slide rail 10. By this configuration, since the lock teeth 49 are formed in a more outer area in the diametrical direction, it is possible to increase the lock strength by sizing up each tooth or to set the pitch more finely. Also, since the position at which the lock member 41 is meshed with the lock teeth 49 becomes more distant from the coupling shaft 2A, the bending load around the coupling shaft 2A, which is applied to the slide lock mechanism 40, is decreased, so that it is possible to exhibit the higher lock strength.

Also, the slide lock mechanism 40 is configured so that when the cam member 42 is rotated in one direction by the urging, it diametrically pushes out the lock member 41 to keep the meshed state of the lock member 41 with the lock teeth 49 of the slide rail 10, and when the cam member 42 is rotated in the other direction against the urging by the operation member (release lever 48) provided at the outside, it releases the lock member 41 from the meshed state with the lock teeth 49. In this way, the cam member 42 for diametrically pushing out the lock member 41 is configured to be rotatable, so that it is possible to make the cam member 42 compact and to configure the cam member 42 capable of strongly pushing out the lock member 41 in the diametrical direction.

Although the illustrative embodiment of the present disclosure has been described with reference to one example, the present disclosure can be implemented in a variety of aspects, in addition to the above illustrative embodiment. For example, the 'vehicular seat' of the present disclosure can be applied to a seat, in addition to a rear seat of an automobile, and can also be applied to a variety of vehicular seats such as a 'seat for a train', a 'seat for an airplane' and a 'seat for a ship'.

Also, the slide lock mechanism may be configured so that the lock member is pushed in the diametrically inward direction and is meshed with the lock teeth of the slide rail. In this case, however, the corresponding configuration is disadvantageous in terms of the securing of the lock strength, as compared to the above configuration (the lock member is pushed out in the diametrically outward direction and is meshed with the lock teeth of the slide rail), because the lock member is locked at a position close to the coupling shaft, which is a center of rotation of the seat back.

Also, the cam member configured to make a movement of pushing out the lock member in the diametrical direction may be configured to diametrically push out the lock member by sliding, not the rotation. Specifically, the cam member may be provided to be slidable in a direction perpendicular to the sliding direction of the lock member, and the cam member may be configured to slide to outwardly push out the lock member by a convex shape formed at the outer peripheral part.

What is claimed is:

1. A reclining structure of a vehicle seat configured to fix a seat back to a side part of a vehicle main body so that a backrest angle can be adjusted, the reclining structure comprising:
   a coupling shaft configured to couple the seat back to the vehicle main body in a state where the seat back is tiltable in a backward and a forward direction;
   a slide rail provided at the side part of the vehicle main body and having a guide shape curved into an arc shape about the coupling shaft;
   a slider mounted to the slide rail to be slidable along the guide shape;
   an attaching and detaching mechanism configured to detachably engage the slider and the seat back with each other; and
   a slide lock mechanism configured to lock movement of the slider relative to the slide rail,
   wherein the slide lock mechanism comprises:
   a lock member guided by and mounted to the slider to be slidable in a radial direction of the arc shape;
   a cam member mounted to the slider to straightly push out the lock member in the radial direction; and
   a lock teeth having a teeth face arranged to face in the radial direction along the guide shape of the slide rail, the lock teeth being configured to mesh with the lock member sliding in the radial direction.

2. The reclining structure according to claim 1, wherein the lock member is configured to be meshed with the lock teeth of the slide rail by being pushed out in a radially outward direction.

3. The reclining structure according to claim 1, wherein the cam member is configured to be rotated in a first rotational direction to push out the lock member in the radial direction toward the lock teeth to keep the lock member in a meshed state, and
   wherein the cam member is configured to be rotated in a second rotational direction that is opposite the first rotational direction to retract the lock member from the lock teeth to release the lock member from the meshed state.

4. The reclining structure according to claim 3, wherein the slide lock mechanism further comprises:
   an urging member configured to urge the cam member to rotate in the first rotational direction.

5. The reclining structure according to claim 4, wherein the cam member is configured to be rotated in the second rotational direction against an urging force by the urging member by an external operation member.

* * * * *